United States Patent [19]
Hinman et al.

[11] Patent Number: 5,390,244
[45] Date of Patent: Feb. 14, 1995

[54] METHOD AND APPARATUS FOR PERIODIC SIGNAL DETECTION

[75] Inventors: Brian L. Hinman, Los Gatos; Shan-Shan Huang, Sunnyvale; Eric K. Gaut, Foster City, all of Calif.

[73] Assignee: Polycom, Inc., San Jose, Calif.

[21] Appl. No.: 119,498

[22] Filed: Sep. 10, 1993

[51] Int. Cl.$^6$ ............................................. H04M 9/08
[52] U.S. Cl. ................................... 379/386; 379/406; 379/410; 379/402
[58] Field of Search ............... 379/386, 406, 410, 402; 381/41; 364/728.07

[56] References Cited

U.S. PATENT DOCUMENTS

| | | | |
|---|---|---|---|
| 4,426,729 | 1/1984 | Gritton | 381/41 |
| 4,766,563 | 8/1988 | Fujimoto | 364/728.07 |
| 4,989,221 | 1/1991 | Qureshi et al. | 379/406 |
| 5,016,271 | 5/1991 | Ford | 379/410 |
| 5,051,981 | 9/1991 | Kline | 379/406 |
| 5,062,102 | 10/1991 | Taguchi | 379/406 |
| 5,151,937 | 9/1992 | Chujo et al. | 379/410 |
| 5,193,112 | 3/1993 | Sano | 379/406 |

OTHER PUBLICATIONS

Moving Discrete Fourier Transform B. G. Sherlock, D. M. Monro IEE Aug. 4, 1992 pp. 279–282.

*Primary Examiner*—James L. Dwyer
*Assistant Examiner*—Jacques M. Saint-Surin
*Attorney, Agent, or Firm*—John S. Ferrell; Leif R. Sloan

[57] ABSTRACT

An apparatus and method for detecting the presence of ringer signals in a telephone which samples the incoming telephone signals within a prescribed time interval, windows the signals, and computes a set of auto-correlation coefficients. These coefficients are normalized, and their absolute values are calculated and summed and compared with an empirically-derived threshold. If the coefficient sum exceeds the threshold, a high degree of correlation within incoming signals is indicated, distinguishing the incoming signal as containing ringer signal constituents.

14 Claims, 4 Drawing Sheets

METHOD AND APPARATUS FOR PERIODIC SIGNAL DETECTION

CROSS-REFERENCE TO RELATED APPLICATIONS

The subject matter of this application is related to and incorporates by reference the subject matter of copending application Ser. No. 07/906,822, entitled "Method and Apparatus For Ringer Detection", filed Jun. 30, 1992, by Brian L. Hinman, Shan-Shan Huang, and Eric Gaul, and commonly assigned with the present invention.

BACKGROUND OF THE INVENTION

1. Field of the Invention

This invention relates to telephone technology and more particularly to the use of a periodic signal detector in a full-duplex speakerphone, to enable the detection of ring-back and periodic signals allowing for selective disabling of adaptive echo canceling filters used in the full-duplex mode of speakerphone operation.

2. Description of the Background Art

Traditional speakerphones function in a half-duplex mode, allowing only one person at a time to speak. When one talker (near-end) is speaking in a half-duplex system, the signals received from the other talker (far-end) are blocked until the near-end speech is either completed or interrupted by a stronger signal. Often, while a talker is speaking, the signals may be blocked if someone at the other end makes moderate noises and activates the microphone. In other cases, talkers are required to shout into the speakerphone in order to be heard by the other end. It is generally very difficult, if not impossible, in a half-duplex system to interrupt current talkers while they are speaking. All of these conditions are very annoying in a teleconferencing situation.

Room acoustic echo has always been one of the most severe problems in hands-free speakerphone systems. Acoustic echoes occur when the far-end speech sent over the telephone line comes out from the near-end loudspeaker, feeds back into a nearby microphone, and then travels back to the originating site. Talkers at the far-end location can hear their own voices coming back slightly after they have just spoken. One method of eliminating these irritating acoustic echoes is to apply an echo suppresser to switch off the microphone while the other end is talking. This results in the half-duplex operation currently implemented on standard speakerphones. More sophisticated acoustic echo cancelers are available for full-duplex operation to improve interactivity in teleconferencing. Acoustic echo cancelers employ adaptive filtering techniques to model the impulse response of the conference room in order to reproduce the echoes from the speaker signal. The estimated echoes are then subtracted from the out-going microphone signals to prevent these echoes from going back to the far-end. The adaptive filter is intended to operate over a broad spectrum of audible frequencies. Because of this wide band of operation, updating the filter coefficients when the limited frequency components found in ring-back or other periodic signals are received causes undesired skewing in the filter adaption. A reliable detector is needed to accurately detect the presence of ring-back and other periodic signals in order to disable the adaptive process and prevent the filter from updating when such signals are present.

SUMMARY OF THE INVENTION

In accordance with the present invention, a method and apparatus are disclosed for detecting the presence of ring-back and periodic signals in telephone communication. The method involves windowing a block of telephone signals received from the far-end. A set of auto-correlation coefficients are then generated, normalized and summed to provide an indicator of the correlation within the incoming signal. Since periodic signals contain a small number of discrete frequencies, the correlation of the periodic signal will be high. The sum of the normalized auto-correlation coefficients is compared to an experimentally-derived threshold and used to disable adaptive filter updating when such periodic signals are present.

The full-duplex speaker in which the present invention operates is implemented using the DSP 16A digital signal processing circuit manufactured by AT&T. In the preferred embodiment, the periodic signal detector comprises a series of programmed instructions which are executed by the signal processing circuit to provide detection of the periodic signal and to disable the adaptive echo filtering.

DESCRIPTION OF THE PREFERRED EMBODIMENT

Figure 1:
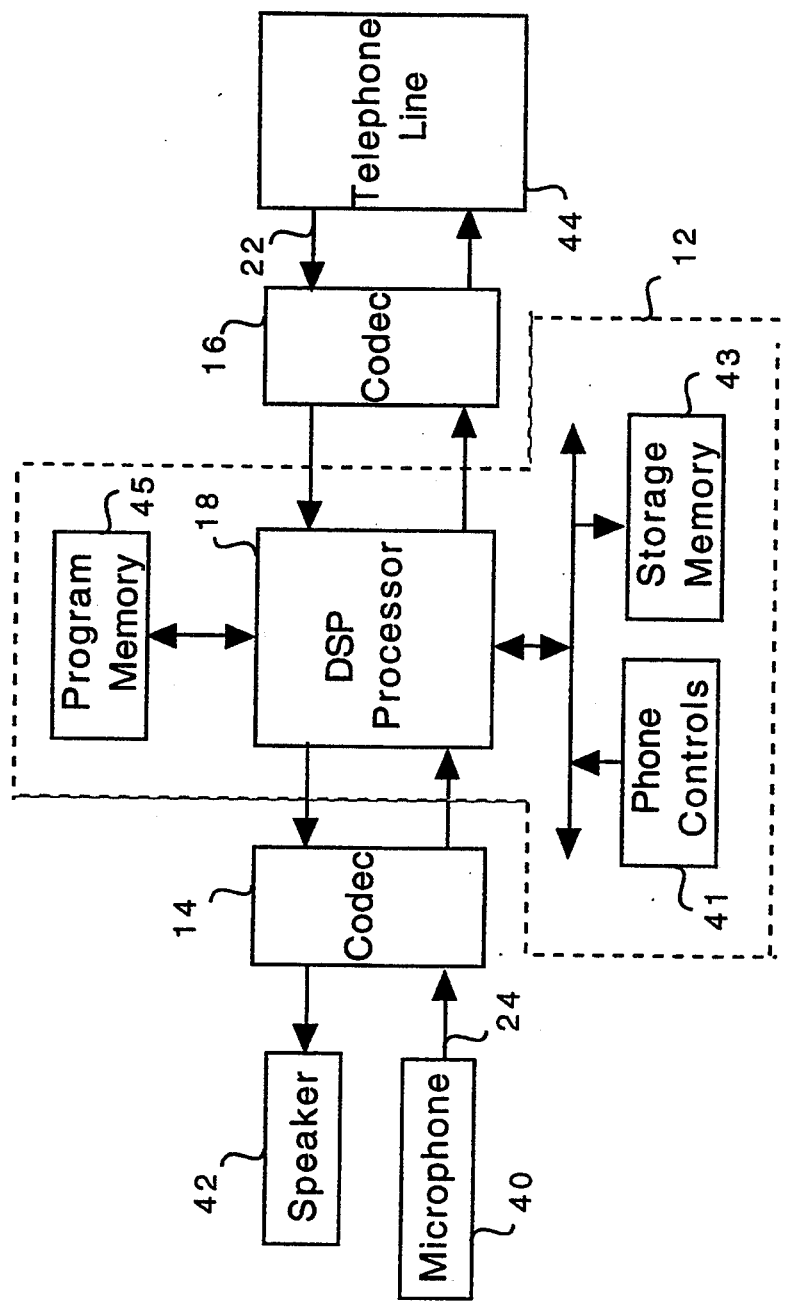
FIG. 1 is a circuit schematic showing the major components of the preferred embodiment of a DSP-implemented speakerphone incorporating the periodic signal detector of the present invention.

Referring now to FIG. 1, a schematic is shown for implementing a full duplex speakerphone 10. Speakerphone 10 comprises two originating signal paths, including speaker signal 22 and microphone signal 24. The speaker signals 22 come from the far-end via telephone line 44, propagate to and through the near-end speaker 42, and are heard by listeners in the near-end. Speech originating from the near-end is detected by microphone 40 and transmitted to the far-end along telephone line 44. The microphone signal 24 coming from the near-end can also include echo coming from the far-end via speaker 42. The primary purpose of digitally processing these speaker and microphone signals (22, 24) is to remove the echoes in the microphone signal 24 so that listeners in the far-end will only hear the near-end talkers, not their own voices coming back after the round-trip delay of telephone transmission. Signal processing also removes the echoes and side tones in speaker signal 22 so that only the far-end speech can be heard in the near-end.

The signal processing of the speakerphone 10 is performed by the speakerphone controller 12, which consists of a DSP processor 18 coupled to phone controls 41, program memory 45, and storage memory 43. The DSP processor 18 is preferably a WE DSP16A, manufactured by AT&T Microelectronics of Allentown, Pennsylvania. The DSP processor 18 is a special purpose microprocessor which executes programmed instructions and is capable of receiving, transmitting and performing complex signal filtering functions on digital telephone signals. Phone controls 41 enable the user to adjust such functions as dialing, volume control, and muting of the microphone signal 24. Phone controls 41 consist of conventional buffer circuitry and switches which may be accessed by DSP processor 18. Program memory 45 is conventional memory for storing the program instructions which implement the various signal processing functions performed by the DSP processor 18. The periodic signal detector, discussed in detail with reference to FIG. 3 below, of the preferred embodiment is a series of executable program steps stored in program memory 45. Storage memory 43 is random access memory which may be used by the DSP processor 18 to store information such as calculation results and phone control states.

Figure 2:
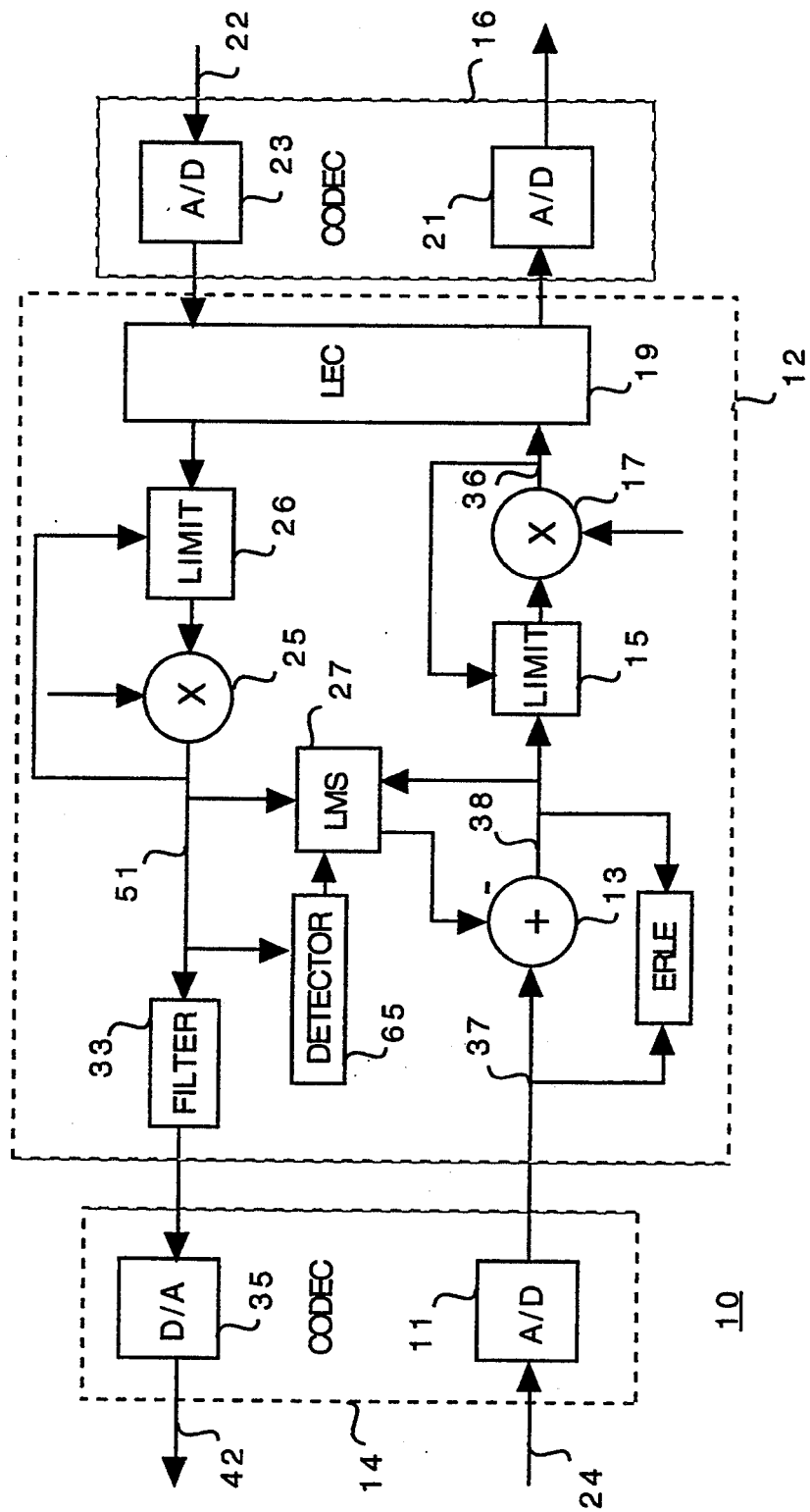
FIG. 2 is a functional block diagram showing the operation of the speakerphone of FIG. 1.

Signals generated at the microphone 40 in the near-end are transmitted into a codec 14, through speakerphone controller 12, and into a codec 16 where the signal may travel to the far-end user along telephone lines 44. Far-end signals are received into codec 16 and processed by speakerphone 12 to be heard at the near-end speaker 42. The codecs 14,16 preferably used are model 7525 codecs commercially available from AT&T Referring now to FIG. 2, a functional block diagram of the speakerphone 10 is shown, particularly identifying the equivalent signal flows of the speakerphone controller 12, including a detector 65 which detects the presence of ring-back and other periodic signals. Analog signals produced by talkers in the near-end are picked up by microphone 40 (FIG. 1), and conditioned for processing by codec 14. Within codec 14, the analog microphone signals 24 are low pass filtered and digitized at 8 kilohertz into 16-bit integers by filter and A/D converter 11.

Signals from the filter and A/D converter 11 are received by speakerphone controller 12 and combined in summer 13 with the output signal of an adaptive Least Means Squared (LMS) filter 27. The output of summer 13 is amplitude constrained by limiter 15 and attenuated by gain adjust 17. The adjusted microphone signal 36 of gain adjust 17 is processed in a Line Echo Canceller (LEC) 19 and transmitted to the far-end through filter and D/A converter 21. All of the components representing the transmit path of the microphone signal 24, including the summer 13, the limiter 15, the gain adjust 17 and the LEC 19 are implemented using programmed instruction steps in conjunction with the speakerphone controller 12.

Speaker signals 22 are digitized at 8 kilohertz by filter and A/D converter 23. The digitized speaker signals 50 along with adjusted microphone signals 36 are used as inputs to line echo canceler (LEC) 19. After passing through the LEC 19, the speaker signals are adjusted by limiter 26 and gain adjust 25. This processed speaker signal 51 is then used as a reference signal for LMS filter 27, and for detector 65 of the present invention. Before the processed speaker signal 51 is propagated through speaker 42 to the near-end, the signal is flattened by digital filter 33 in order to compensate for any spectral variations introduced by speaker 42. Signal flattening involves the equalization of the frequency response to flatten the shape of the spectrum at microphone input 24. Conversion from digital to analog occurs in filter and D/A converter 35. Speakerphone 10 employs a conventional adaptive LMS filter 27 for modeling the near-end room impulse response, and for simulating echoes from the processed speaker signal 51. These echoes are then subtracted from the near-end signal to prevent the echoes from going back to the far-end. LMS filter 27 adjusts its coefficients constantly to keep track of the changes in the near-end environment.

Detector 65 operates on the processed speaker signal 51 in order to detect the presence of incoming periodic signals from the far-end. LMS filter 27 is intended to operate over a broad spectrum of audible frequencies, and updating of the filter coefficients when periodic frequency components are received, causes undesired skewing in the adaption of filter 27. Examples of highly correlated or periodic signals include ring-back signals, DTMF (Dual Tone Multi Frequency) tones, certain speech sounds, and many background and line noise constituents. Detector 65 monitors the incoming processed speaker signal 51 to determine whether such correlated signals are present. When correlated signals are detected, the updating of LMS filter 27 coefficients is disabled.

Echoes arriving in microphone signal 24 are subtracted by LMS filter 27 in summer 13 so that only signals generated in the near-end are sent to the far-end. A feedback signal is received by LMS filter 27 from the output of summer 13 in order to monitor the effectiveness of the adaptive filtering process.

Figure 3A:
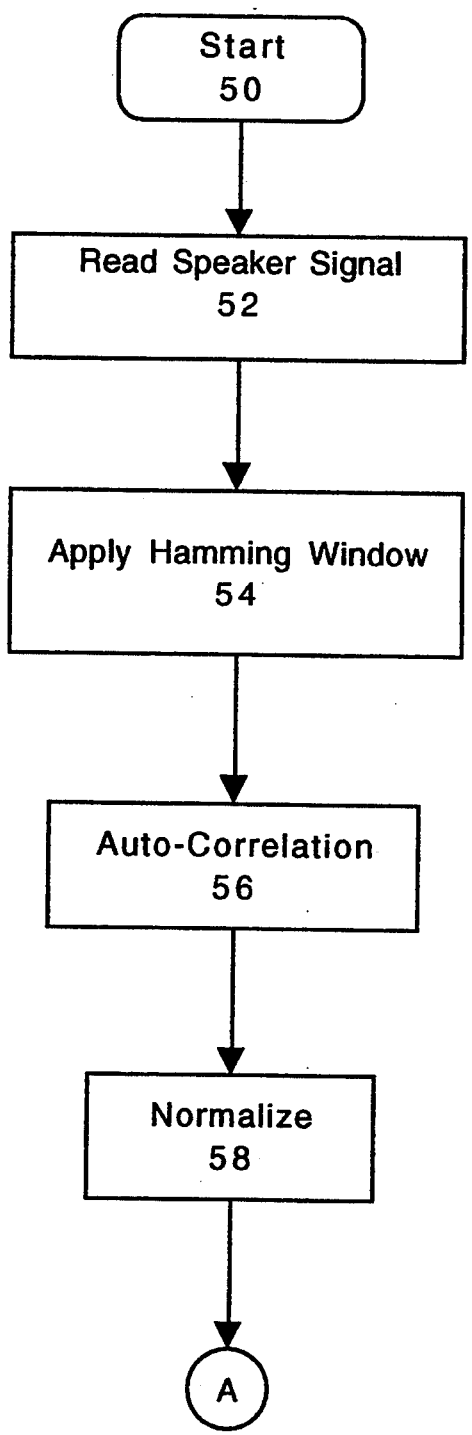
FIGS. 3(a) and 3(b) contain a flow chart showing the preferred processing steps for implementing the detector of the present invention.
Figure 3B:
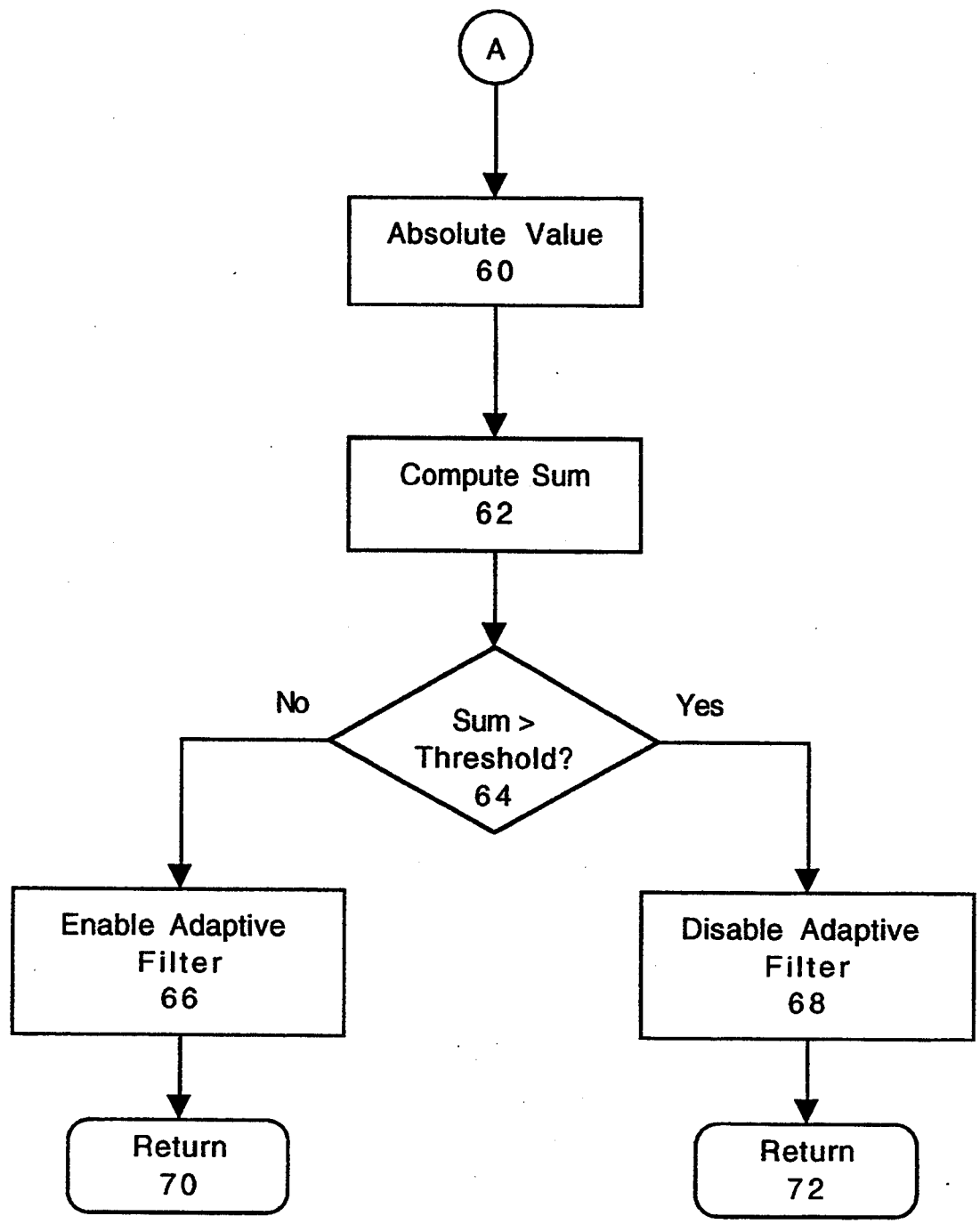

Referring now to FIGS. 3(a) and 3(b), a flow diagram illustrates the detailed operation of the preferred detector 65. The detector 65 is implemented by speakerphone controller 12 (FIG. 1) as the execution of digital programmed instructions stored in program memory 45. The execution of the programmed instructions occurs in DSP processor 18 in conjunction with storage memory 43 and various signal inputs and outputs as discussed with reference to FIG. 1.

The program starts in step 50 with the reading 52 of speaker signal 51 over a period of approximately 20 millisecond duration. This 20 millisecond period represents 160-sample points, collected using an 8 KHz. clock. The samples are collected and stored in storage memory 43 (FIG. 1) by DSP processor 18. Once read 52, a conventional Hamming window is applied 54 to the block of 160 samples in order to remove edge aliasing. Reference to Hamming windows is found in Oppenheim & Schafer. *Digital Signal Processing*, Prentice Hall, 1975, p. 242. Subsequent to the window filtering of step 54, a conventional auto-correlation function is applied 56 to the 160-sample set of data to produce a series of eleven auto-correlation coefficients: R(0), R(1). . . R(10). A detailed discussion of auto-correlation functions can be found in Oppenheim & Schafer, pp. 376 ∝ 388.

Application of the auto-correlation function of step 56 begins by copying the 160-sample set (conveniently referred to as block #1) to produce a second 160-sample set (referred to as block #2) of signals. The auto-correlation coefficients R(0)-R(10) are produced by multiplying the sample blocks #1 and #2 together. Coefficient R(0) is calculated from the equation:

$$R_{(0)} = \frac{1}{128} \sum_{n=0}^{159} S1_n * S2_n \qquad (1)$$

where S1 and S2 respectively represent block #1 and block #2, and where the sum of products is divided by 128 to reduce the data size of the resulting value. Coefficient R(1) is calculated by shifting the first sample of block #2 by a zero sample and adding a zero to the end of the block #1 set, and then by multiplying the blocks as above. The coefficient R(1) can be calculated from the equation:

$$R_{(1)} = \frac{1}{128} \sum_{n=0}^{159} S1_n * S2_{n+1} \quad (2)$$

The remaining nine coefficients are equivalently shifted and multiplied according to the following equations:

$$R_{(2)} = \frac{1}{128} \sum_{n=0}^{159} S1_n * S2_{n+2} \quad (3)$$

$$R_{(3)} = \frac{1}{128} \sum_{n=0}^{159} S1_n * S2_{n+3} \quad (4)$$

$$R_{(4)} = \frac{1}{128} \sum_{n=0}^{159} S1_n * S2_{n+4} \quad (5)$$

$$R_{(5)} = \frac{1}{128} \sum_{n=0}^{159} S1_n * S2_{n+5} \quad (6)$$

$$R_{(6)} = \frac{1}{128} \sum_{n=0}^{159} S1_n * S2_{n+6} \quad (7)$$

$$R_{(7)} = \frac{1}{128} \sum_{n=0}^{159} S1_n * S2_{n+7} \quad (8)$$

$$R_{(8)} = \frac{1}{128} \sum_{n=0}^{159} S1_n * S2_{n+8} \quad (9)$$

$$R_{(9)} = \frac{1}{128} \sum_{n=0}^{159} S1_n * S2_{n+9} \quad (10)$$

$$R_{(10)} = \frac{1}{128} \sum_{n=0}^{159} S1_n * S2_{n+10} \quad (11)$$

Following generation of the auto-correlation coefficients in step 56, the coefficients are normalized 58 by first shifting the bits comprising coefficient R(0) from the least significant bit to the most significant bit until the most significant bit of R(0) contains a value of 1. Each of the remaining coefficients R(1) through R(10) are subsequently normalized by shifting the bits for each coefficient by the same number of bits used to normalize R(0). For example, if the normalization of the R(0) coefficient requires five shift operations in order to achieve a most significant bit of one, then each of the other coefficients R(1)-R(10) will also be shifted equivalently by five shift operations. Following the normalization 58, the absolute value is determined 60 for each of the coefficients R(1)-R(10) and the sum of the coefficients R(1)-R(10) is then calculated in step 62. By taking the absolute values 60 of each of the normalized coefficients and computing the sum 62 of the normalized coefficients R(1)-R(10), a figure of merit is generated 63 as to the correlation of processed speaker signal 51. Since the ring-back comprises a limited set of discrete frequency sinusoids, the correlation of frequency components is high, and the ring-back and other periodic signals can be thus easily detected by comparing 64 the computed sum 62 to an experimentally derived threshold.

Determination of the appropriate threshold value for use in the comparison of step 64 is made by varying the value of the threshold to optimize the speakerphone's 10 Echo Return Loss Enhancement (ERLE). The ERLE is a conventional measurement criteria in the present art. The parameter Echo Return Loss is defined as the signal loss which results from system components such as the microphones, speakers, wire and from the room acoustics. The ERLE is the enhanced or improved losses due to the LMS filter 27. ERLE is calculated using two blocks of 160 samples each collected within the speakerphone controller 12 using an 8 KHz. clock. One of two blocks of collected data is sampled at data point 37 in speakerphone controller 12, and the second block of data is collected at data point 38. The energy values of each of these blocks is calculated according to the equation:

$$\text{Energy} = \sum_{n=0}^{159} (X_n)^2 \quad (12)$$

The energy value corresponding to those samples collected at data point 37 is called the Pre-Echo Canceller Energy. The energy value corresponding to those samples collected at data point 38 is called the Post-Echo Canceller Energy. The two energies are normalized with respect to each other by left-shifting each until the larger of the two energies has a "1" in its most significant bit and both energies have been left-shifted the same amount. A number of each of these energies is accumulated to produce average energy values, and the ratio of Post-Echo Canceller Energy to Pre-Echo Canceller Energy is taken. The result of this division is referred to as the ERLE.

Determination of the proper threshold for use in step 64 is made by applying various common periodic and speech signals to the A/D converter 23 and the threshold value is adjusted to optimize the ERLE measurement. For example, in the preferred embodiment where R(0) is set to a value of "1", the preferred threshold is set to 0.5. It should be noted that this threshold number is not critical and may be varied widely to suit transmission and local telephone switching network standards.

When the computed sum 62 is not greater than the threshold in step 64, the speaker signal 51 is determined to be uncorrelated and the LMS filter 27 adaption is enabled 66. Following enablement 66 of the LMS filter, the routine returns in step 70. When the computed sum 62 is greater than the threshold in step 64, the speaker signal 51 is determined to be correlated, containing periodic signals such as ring-back, and the LMS filter 27 adaption is disabled 68. Following disablement 68 of the LMS filter, the routine returns in step 72.

In preferred operation, the method steps of FIGS. 3(a) and 3(b) repeats approximately every 20 milliseconds.

A method and apparatus have now been described for the detection of periodic signals received during telephone communications. A set of eleven auto-correlation coefficients is generated 56, and these coefficients are normalized 58, the absolute values are taken 60 and the ten lower-order normalized coefficients are summed 62 and compared to a threshold. If the threshold value is exceeded, the received (processed speaker) signal 51 is recognized as being highly correlated and identified as a ring-back or periodic signal. Detection of periodic signals results in the disablement 68 of the adaptive LMS filter 27 used in the speakerphone 10. This is a preferred embodiment of the method and apparatus of the present invention. Variations of the above, such as rearrangement of the method steps and use of varying numbers of correlation coefficients, filter configurations and threshold values, will be clearly obvious to those ordinarily skilled in the art. It is therefore intended that the above invention only be limited by the claims appended below.

What is claimed is:

1. A method for detecting the presence of periodic signals in an incoming telephone signal, the method comprising the steps:

generating a series of auto-correlation coefficients from the incoming telephone signal, the coefficients comprising a fundamental coefficient and a series of higher-order coefficients;

computing the sum of the auto-correlation coefficients which represents the correlation between frequency components comprising the incoming signal; and comparing the sum of auto-correlation coefficients to a predetermined threshold value in order to determine whether the incoming signal contains periodic signals.

2. The method according to claim 1, wherein the step of generating is preceded by the step of digitizing the incoming telephone signal to produce a block of discrete-time samples.

3. The method according to claim 2, wherein the step of generating is preceded by windowing the block of discrete-time samples of the incoming telephone signal.

4. The method according to claim 3, wherein the step of windowing discrete-time samples of the incoming telephone signal is performed using the Hamming window method.

5. The method according to claim 2, wherein the block of discrete-time samples contains 160 samples.

6. The method according to claim 2, wherein digitizing the incoming telephone signal to produce a block of discrete-time samples is performed over a period of 20 milliseconds.

7. The method according to claim 1, further comprising the step of normalizing the series of higher-order coefficients with respect to the fundamental coefficient.

8. The method according to claim 7, further comprising the step of setting the value of the generated fundamental coefficient to unity.

9. The method according to claim 7, further comprising the step of setting the value of each normalized coefficient to its absolute value.

10. The method according to claim 1, further comprising the step of deriving the value of the predetermined threshold such that computed sums which exceed this threshold are identifiable as correlated periodic signals and computed sums which are less than this threshold are identifiable as uncorrelated non-periodic signals.

11. The method according to claim 1, wherein any filter adaptation occurring based on the incoming telephone signal is disabled.

12. An apparatus for detecting the presence of periodic signals in an incoming telephone signal, the apparatus comprising:

analysis means connected to the incoming telephone signal for receiving the telephone signal and generating a set of auto-correlation coefficients, including a fundamental coefficient and a set of higher order coefficient;

computing means connected to the analysis means for receiving and summing the coefficient values, wherein the sum of the coefficient values represents the correlation between frequency components of the incoming telephone signal; and comparing means connected to the computing means for receiving and comparing the sum produced in the computing means to a pre-stored threshold value and for producing an output signal indicating the relative correlation between frequency components within the incoming telephone signal.

13. The apparatus for detecting the presence of periodic signals as in claim 12 further comprising:

normalizing means connected between the analysis means and the computing means for receiving the auto-correlation coefficients from the analysis means and for normalizing the higher-order coefficients with respect to the fundamental coefficient prior to transmitting the auto-correlation coefficients to the computing means.

14. The apparatus for detecting the presence of periodic signals as in claim 12 further comprising:

absolute value means connected between the analysis means and the computing means for receiving the normalized auto-correlation coefficients from the analysis means and for converting each coefficient to its absolute value prior to transmitting the auto-correlation coefficients to the computing means.

* * * * *

UNITED STATES PATENT AND TRADEMARK OFFICE
CERTIFICATE OF CORRECTION

PATENT NO. : 5,390,244
DATED : February 14, 1995
INVENTOR(S) : Brian L. Hinman, Shan-Shan Huang, Eric Gaut It is certified that error appears in the above-indentified patent and that said Letters Patent is hereby corrected as shown below:

Column 1, line 12, delete "Gaul" and insert --Gaut--

Signed and Sealed this

Second Day of May, 1995

Attest:

BRUCE LEHMAN

Attesting Officer    Commissioner of Patents and Trademarks